United States Patent
Gasser et al.

(10) Patent No.: US 6,324,946 B1
(45) Date of Patent: Dec. 4, 2001

(54) SCREWDRIVER ADAPTER

(75) Inventors: Daniel Gasser, Diepoldsau; Erich Palm, Au; Sven Sieber, Diepoldsau, all of (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 09/445,116

(22) PCT Filed: Apr. 28, 1998

(86) PCT No.: PCT/EP98/02499

§ 371 Date: Dec. 2, 1999

§ 102(e) Date: Dec. 2, 1999

(87) PCT Pub. No.: WO98/55269

PCT Pub. Date: Dec. 10, 1998

(30) Foreign Application Priority Data

Jun. 2, 1997 (DE) .............................. 197 23 056

(51) Int. Cl.[7] ................................... B25B 13/04
(52) U.S. Cl. ................. 81/121.1; 81/177.4; 81/125
(58) Field of Search ............... 81/53.2, 120, 121.1, 81/124.3, 124.4, 124.7, 125, 125.1, 177.4, 489

(56) References Cited

U.S. PATENT DOCUMENTS

| 3,023,015 | | 2/1962 | Pankow . | |
|-----------|---|--------|----------|----|
| 3,979,978 | * | 9/1976 | Smolik | 81/120 |
| 4,593,583 | | 6/1986 | Singleton . | |
| 4,615,242 | * | 10/1986 | Millin | 81/3.08 |

FOREIGN PATENT DOCUMENTS

| 36 10 749 | 4/1990 | (DE) . |
| 95 19 325 | 3/1996 | (DE) . |
| 195 13 748 | 10/1996 | (DE) . |
| 0 723 086 | 1/1996 | (EP) . |

* cited by examiner

*Primary Examiner*—James G. Smith
(74) *Attorney, Agent, or Firm*—Volpe & Koenig, P.C.

(57) ABSTRACT

A screwdriver adapter (1) is provided with a receiving part (3) having an interior space (5). At the open end of the pot-shaped receiving part (3) there is inserted a nut-shaped element (2) in torsionally rigid and axially secured relationship. Adjoining the tool driving means (6) there is disposed a channel (8), which passes axially through the nut-shaped element (2) and extends as far as the interior space (5) of the receiving part (3). Drive portions broken off by overtorquing a screw in the tool driving means (6) can travel via the channel (8) into the interior space (5) of the receiving part (3), where they can be collected until an emptying process.

6 Claims, 1 Drawing Sheet

SCREWDRIVER ADAPTER

BACKGROUND OF THE INVENTION

The invention relates to a screwdriver adapter, with a drive part which fits a screwdriver and with a nut-shaped element containing a tool driving means for driving in a screw having a drive portion that can be broken off, twisted off or torn off by intentional overtorquing, the nut-shaped element being provided with a channel extending from the tool driving means.

To create an overtorquing safeguard for screws, or in other words a firm seat for screws without causing damage to the threaded region, the possibility is provided among others that the drive portion of a screw or an appropriate part of the drive portion is broken off, twisted off or torn off during final setting of a screw, whereupon the setting process is ended. Usually such an overtorquing safeguard is created by providing a predetermined breaking point. The drive portions broken off, twisted off or torn off in this case cannot be left simply to be around thereafter, regardless of the type of processing, since damage to the surface of the fastened workpieces or coverings disposed thereover can ensure under certain circumstances.

From European Patent Application EP 0723086 A there is already known a screwdriver adapter which is provided with a drive part to fit a screwdriver and a nut-shaped element constituting a tool driving means. This adapter for driving in a screw is provided with a drive portion that can be broken off, twisted off or torn off by intentional overtorquing. The nut-shaped element is provided with a channel extending from the tool driving means, through which channel a drive portion broken off from a screw can fall out, first in axial direction and then in radial direction. At the rear end of the nut-shaped element provided with the tool driving means there is disposed a free space, which is open over an angle of more than 180°, so that the broken-off drive portion can fall out freely after exiting the channel.

BRIEF SUMMARY OF THE INVENTION

The object of the present invention is therefore to provide a screwdriver adapter with which the broken off, twisted off or torn off drive portions of a screw can be received and collected.

According to the invention, this is achieved in that the channel opens into an interior space of a pot-shaped receiving part for drive portions broken off, twisted off or torn off from a screw, the open end of this receiving part being closed from the nut-shaped element, which is inserted in torsionally rigid and axially secured relationship to the channel passing through the nut-shaped element, and its opposite end being equipped with the drive part which fits a screwdriver.

By this feature according to the invention there is created the possibility that an appropriate drive portion can be transferred immediately after being broken off, twisted off or torn off through a channel into an interior space of a receiving part, where a plurality of such separated drive portions can be received. As soon as an appropriate quantity of such drive portions has been collected in the interior space of the receiving part, it can be emptied. In this way additional working effort for picking up and collecting the separated drive portions is obviated.

Since the receiving part is pot-shaped, wherein its open end is closed from the nut-shaped element, which is inserted in torsionally rigid and axially secured relationship, to the channel passing through the nut-shaped element, the nut-shaped element itself can be removed in order to empty the receiving part, ensuring that no additional features with corresponding openings in the receiving part have to be provided. The receiving part can therefore be constructed with simple structure, for practical purposes substantially as a hollow cylinder, which is closed at the open end by the nut-shaped element itself.

Further possibilities are opened up precisely by this interchangeable holder. For example, it is possible in one alternative embodiment for the nut-shaped element to be made with a tool driving means at both of its ends and to be insertable into the receiving part in torsionally rigid and axially secured relationship via one of the two ends, which are axially separated from each other. To achieve, for example, longer service life of the nut-shaped element, it is therefore possible to design the same with a tool driving means at both ends thereof.

In this connection it is particularly advantageous for two differently shaped tool driving means to be provided at the two ends of the nut-shaped element for engaging with differently shaped drive portions. Thus the nut-shaped element can be used for various drive portions of screws, and especially for screws which have two different drive portions at the same time. In such a case, the one drive portion is designed to be broken off, twisted off or torn off, whereas the other drive portion provides the ability, should the need arise, of subsequently loosening the screw again after it has already been finally set. These two drive portions however, have in principle different shapes and/or sizes, and the respective desired tool driving means can be formed at the two ends of the nut-shaped element. Of course, only one tool driving means together with the receiving part is needed while the screw is being driven in, since only one drive portion to be broken off, twisted off or torn off during the driving-in process is provided on any given screw. The possibility thereof exists, however, of using the adapter for the screwdriver universally, although for such screws the frequency of the driving-in process is substantially greater than the process of extraction of screws.

To ensure that the screw to be driven in can be appropriately held together with its drive portion in the nut-shaped element until the screw has been set on the workpiece, it is suggested according to the invention that holding elements engaging resiliently in radial direction in the recess of the tool driving means be provided in the region of at least one of the tool driving means of the nut-shaped element. In this way the possibility is achieved that the screw can be inserted captively and set better via its drive portion by appropriate application of force.

To ensure that the torque can be transmitted properly from the adapter to the screw, a torsionally rigid holder is required between receiving part and nut-shaped element. To achieve this, one alternative embodiment provides that a circumferential shoulder with a toothed profile, polygonal structure or analogous shape is formed approximately in the middle region relative to the axial length of the nut-shaped element, and that a complementary toothed profile, polygonal structure or analogous shape is provided at the open rim region of the pot-shaped receiving part in order to forcibly turn the nut-shaped element. Thereby there is created, for transmitting the necessary torque, a simple joint which can be made by inserting the receiving part and the nut-shaped element together in axial direction. Thus there is no need for a complex assembly or for any kind of immobilization of screws or couplings.

The simple possibility of mounting the nut-shaped element in a receiving part is improved in particular in that an annular groove is formed at a distance from the respective end of the nut-shaped element, in which groove there engages, to hold the nut-shaped element axially, a resilient annular element such as an O-ring, inserted in a groove in the inside wall of the pot-shaped receiving part. Upon insertion to form the torsionally rigid joint, an axially secure relationship between the two parts, or in other words the nut-shaped element and the receiving part, can simultaneously be achieved. Since the axial holder does not have to transmit any large forces, simple assembly and disassembly of the nut-shaped element is possible, on the one hand for changing the tool driving means, which are different at the two ends, and on the other hand for emptying the drive portions collected in the interior space of the receiving part.

BRIEF DESCRIPTION OF THE SEVERAL VIEWS OF THE DRAWINGS

Further features according to the invention are special advantages will be explained in more detail in the description hereinafter with reference to the drawing, wherein.

DETAILED DESCRIPTION OF THE INVENTION

Figure 1:
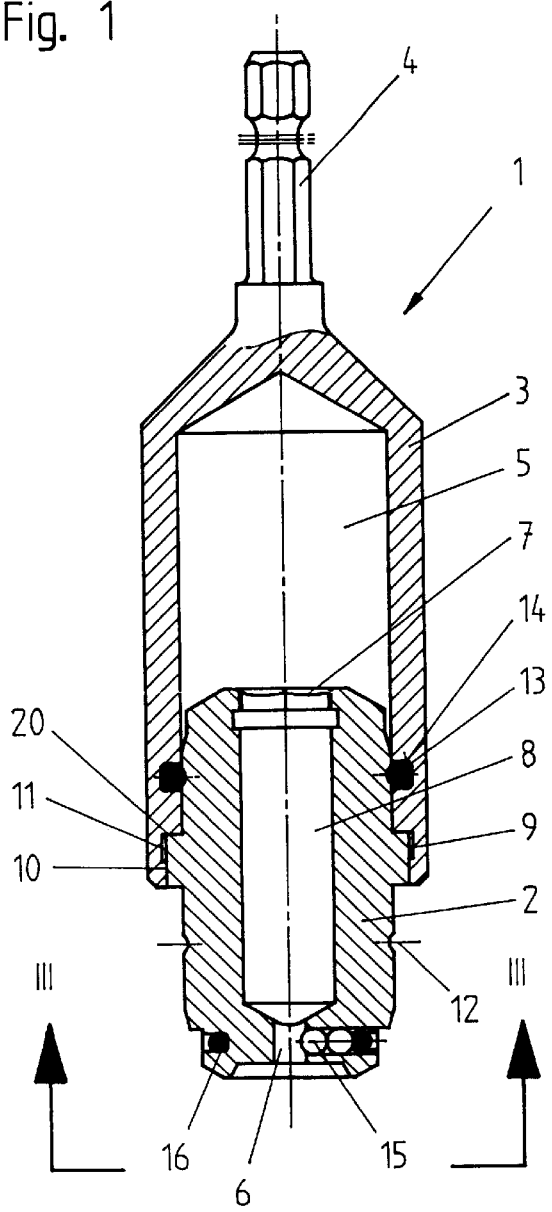
FIG. 1 shows a section through a screwdriver adapter according to the invention.
Figure 3:
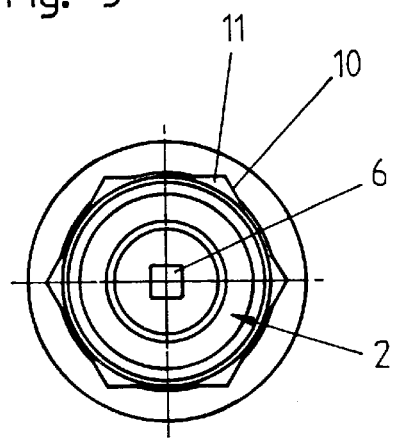
FIG. 3 shows view III—III in FIG. 1.

An adapter 1 for a screwdriver comprises, in the manner according to the invention, a receiving part 3 and a nut-shaped element 2. Adjoining receiving part 3 is a drive portion 4 which fits a screwdriver and with which the adapter can be forcibly turned by a screwdriver and held axially therein.

This adapter according to the invention is designed to be used in particular for driving in screws 17, which are provided with a drive portion 18 that can be broken off, twisted off or torn off by intentional overtorquing. For this purpose nut-shaped element 2 has a tool driving means 6, which is constructed to correspond substantially to drive portion 18 of screw 17. Adjoining tool driving means 6 there is disposed in nut-shaped element 2 a channel 8, which opens into an interior space 5 of receiving part 3, which advantageously is pot-shaped.

When screw 17 is now set and there is applied a torque, which in the case, for example, that a predetermined breaking point is disposed at the end of drive portion 18 adjacent to the screw, causes drive portion 18 to be twisted off, then adapter 1 could well be turned further without further turning of screw 17 itself, although the driving-in process for the screw is then ended. Torn off or twisted off drive portion 18 then travels directly into channel 8 and from there into interior space 5 of receiving part 3. Twisted off receiving parts 18 are thus consecutively received in channel 8 and in interior space 5 adjoining it.

A simple alternative is achieved, when receiving part 3 is pot-shaped, in which case nut-shaped element 2 itself closes off the open end of receiving part 3 for practical purposes, and so only channel 8 above tool driving means 6 is still open into interior space 5.

Of course, a joint with appropriate torsional rigidity must be created between inserted nut-shaped element 2 and receiving part 3, and axial securing means must also be provided to ensure that nut-shaped element 2 does not fall or be forced inadvertently out of receiving part 3.

Figure 2:
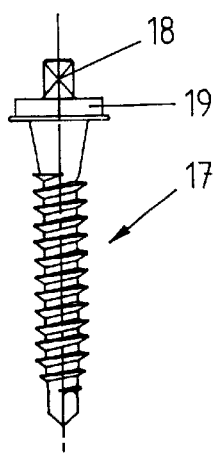
FIG. 2 shows a view of a screw that can be operated, for example, with this adapter.

Heretofore reference has been made to a nut-shaped element having a tool driving means 5 at one of its ends. Since nut-shaped element 2 itself forms the closure of receiving part 3, another advantageous construction can be additionally created in that the corresponding parts for torsionally rigid and axially secured disposition of the nut-shaped element are made as mirror images, as it were, at two different ends. In this case it is possible to provide, at the two ends of nut-shaped element 2 separated by an axial distance, tool driving means 6 and 7, which are expediently shaped such that they can accommodate different structures of drive portions 18 and 19. In special screw 17 according to FIG. 2, there are provided two drive portions 18 and 19, of which drive portion 18 can be twisted off or torn off by virtue of a predetermined breaking point, and drive portion 19 is used in order to be able to extract the screw once again if the need arises. For this purpose there is required a separate drive portion 19, which for practical purposes is also substantially larger-sized and cannot be grasped with the same tool driving means 6 of nut-shaped element 2. In the presented diagram, drive portion 18 is constructed, for example, as a square, while drive portion 19 is hexagonal. Accordingly, tool driving means 6 will be used for driving in the screw, while tool driving means 7 will be used for extracting screw 17 should the need arise.

It would also be entirely conceivable, however, to provide two identically shaped tool driving means 6 and 7 at the two ends of nut-shaped element 2, in order to double the service life of a single nut-shaped element 2, which is achieved by reversing the nut-shaped element after prolonged use of one end thereof.

To ensure that screw 17 inserted beforehand with its drive portion 18 is adequately held axially in the nut-shaped element until the screw is finally set or partly driven into the corresponding workpiece, a holding element 15, also engaging resiliently in known manner in radial direction in the recess of tool driving means 6, can be provided in nut-shaped element 2 according to the invention. This holding element 15, which can have the form, for example, of a ball or a stud, can be urged radially toward the tool driving means by an appropriate resilient element 16.

Appropriate measures must be provided to ensure that nut-shaped element 2 can be forcibly turned by and secured axially in receiving part 3. In the illustrated alternative embodiment, the nut-shaped element is equipped with a circumferential shoulder, which is disposed approximately in the middle region relative to the axial length of nut-shaped element 2. At its circumstance, shoulder 9 is advantageously provided with a polygonal structure 11. At the open rim region of pot-shaped receiving part 3 there is then provided a complementary polygonal structure 10 in the form of a complementary opening for forcibly turning nut-shaped element 2. Moreover, at a distance from the respective end of nut-shaped element 2 there is formed an annular groove 12, in which there engages a resilient annular element 13 in a groove 14 in the inside wall of pot-shaped receiving part 3 to ensure that nut-shaped element 2 is held axially. A kind of O-ring can also be used for this purpose. It is now immaterial with which end nut-shaped element 2 is thrust into interior space 5 of receiving part 3, since forced turning is always ensured by the complementary shape in the region of shoulder 9 and the corresponding disposition at the free end of receiving part 3, as is an axially secure relationship by annular element 13 and associated grove 12. The screwing-in pressure in axial direction is transmitted through shoulder 9, since this is braced against a stop 20 of receiving part 3.

Instead of a polygonal structure 11 or 10 for mutual forced turning, it is also possible to provide, for mutual joining, a type of toothed profile by means of which nut-shaped element 2 and receiving part 3 can engage interlockingly in each other.

As already explained, a complementary tool driving means 6 is inherently adequate at one end of nut-shaped element 2, so that nut-shaped element 2 itself could be made substantially shorter. In such a case, the only requirements are appropriate holding by annular element 13, which engages in a groove 14, and the disposition of shoulder 9 with the complementary toothed profile or polygonal structure or analogous shape.

Tool driving means 6 and 7, which are very different precisely in size and shape, have the positive result that there can adjoin tool driving means 6 a channel 8 with cross section larger than that of the said drive, in order to facilitate removal of torn off drive portion 18.

Several other alternative embodiments of the manner in which nut-shaped element 2 can be joined to receiving part 3 are conceivable. It would also be conceivable, for example, to provide nut-shaped element 2 with an external circumferential groove or with pot-shaped structure, in order to be able to engage over the rim region of the pot-shaped receiving part. Under certain circumstances the corresponding joint would then be formed not on the inside of the pot-shaped receiving part but on the outside wall of receiving part 3. In this way a joint could be achieved, for example, by means of a threaded screw coupling, by means of a kind of quarter-turn fastener or in similar way by means of resilient annular elements and toothed profiles, polygonal structures or analogous shapes of various geometries.

The adapter according to the invention still proves to be particularly advantageous, since it does not absolutely have to be used for driving in screws, or it can be used only when drive portions to be broken off, twisted off or torn off are present. By virtue of the extremely simple construction and the special structure of the nut-shaped element itself, such an adapter can be used for driving in any kind of screws.

What is claimed is:

1. A screwdriver adapter, with a drive part (4) which fits a screwdriver and with a nut-shaped element (2) including tool driving means (6, 7) for driving in a screw (17) having a drive portion that can be broken off, twisted off or torn off by intentional overtorquing, the nut-shaped element (2) being provided with a channel (8) extending between the tool driving means (6, 7), and passing through said element (2), and characterized in that the channel (8) opens into an interior space (5) of a pot-shaped receiving part (3) for drive portions (18) broken off, twisted off or torn off from a screw (17), the open end of this receiving part being closed by the nut-shaped element (2), which is inserted in torsionally rigid and axially secured relationship in said open end of said receiving part (3), and the opposite end of said receiving part (3) being equipped with said drive part (4) which fits a screwdriver.

2. An adapter according to claim 1, characterized in that the nut-shaped element (2) is made with said tool driving means (6, 7) at its opposite ends and is insertable into said receiving part (3) via one of said two ends, which are axially separated from each other.

3. An adapter according to claim 1, characterized in that said tool driving means (6, 7) are differently shaped for engaging with differently shaped drive portions (18, 19).

4. An adapter according to claim 1, characterized in that a recess is provided in the region of at least one of the tool driving means (6, 7) and in that holding element (15) engage resiliently in radial direction in said recess.

5. An adapter according to claim 1, characterized in that a circumferential shoulder (9) with a polygonal shape (11) is formed approximately in the middle region of the axial length of the nut-shaped element (2), and in that a complementary polygonal shape (10) is provided inside the open rim region of the pot-shaped receiving part (3), adapted to forcibly turn the nut-shaped element (2).

6. An adapter according to claim 1, characterized in that an annular groove (12) is formed at a distance from each end of the nut-shaped element (2), in which groove (12) there engages, to hold the nut-shaped element (2) axially, a resilient annular element (13), inserted in a groove (14) in the inside wall of the pot-shaped receiving part (3).

* * * * *